Figure 6:
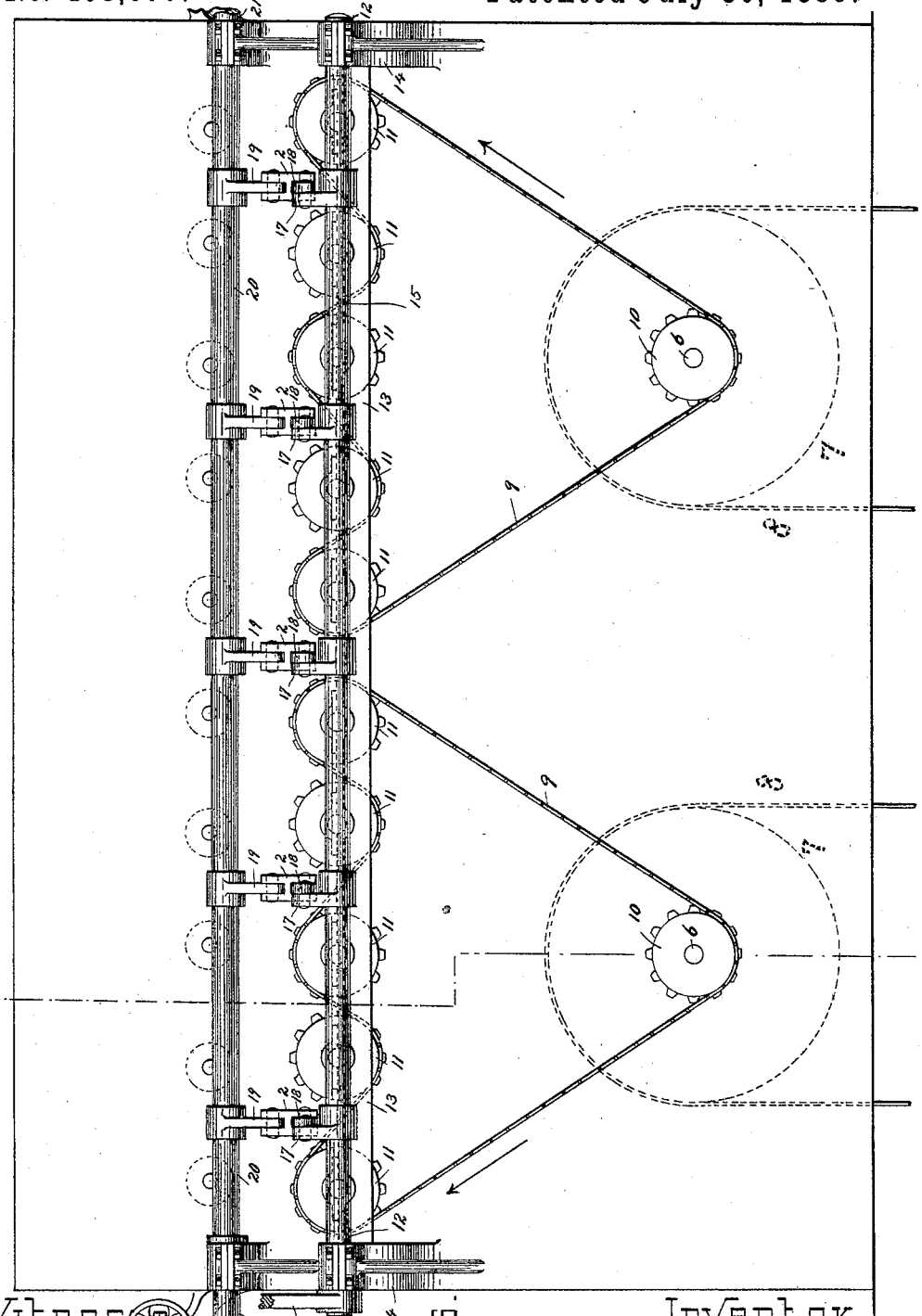

(No Model.) 5 Sheets—Sheet 1.
G. A. BUCHHOLZ, Dec'd.
O. KNIGHT, Administrator.
GRAIN HULLING AND REDUCING MACHINE.
No. 408,077. Patented July 30, 1889.
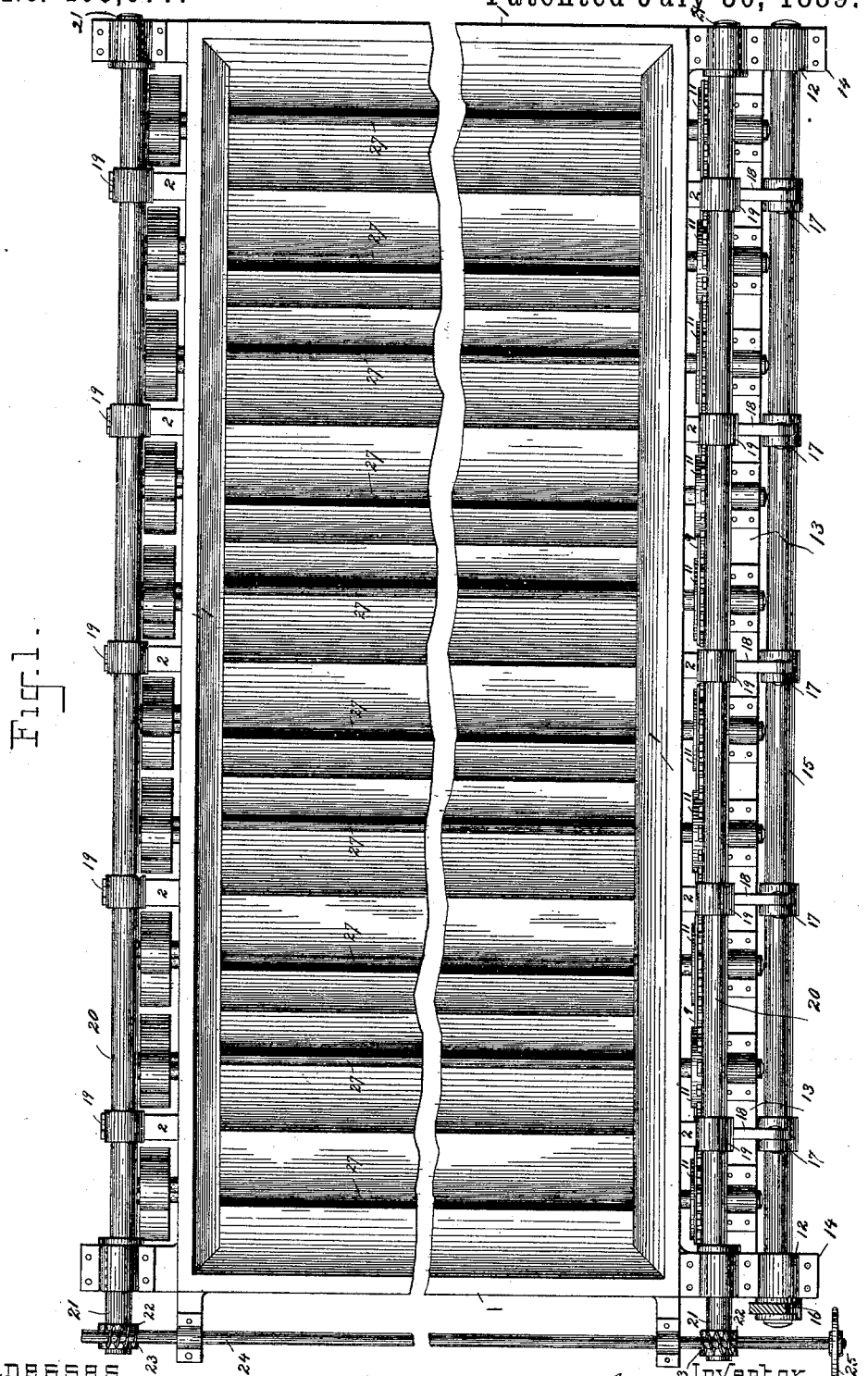

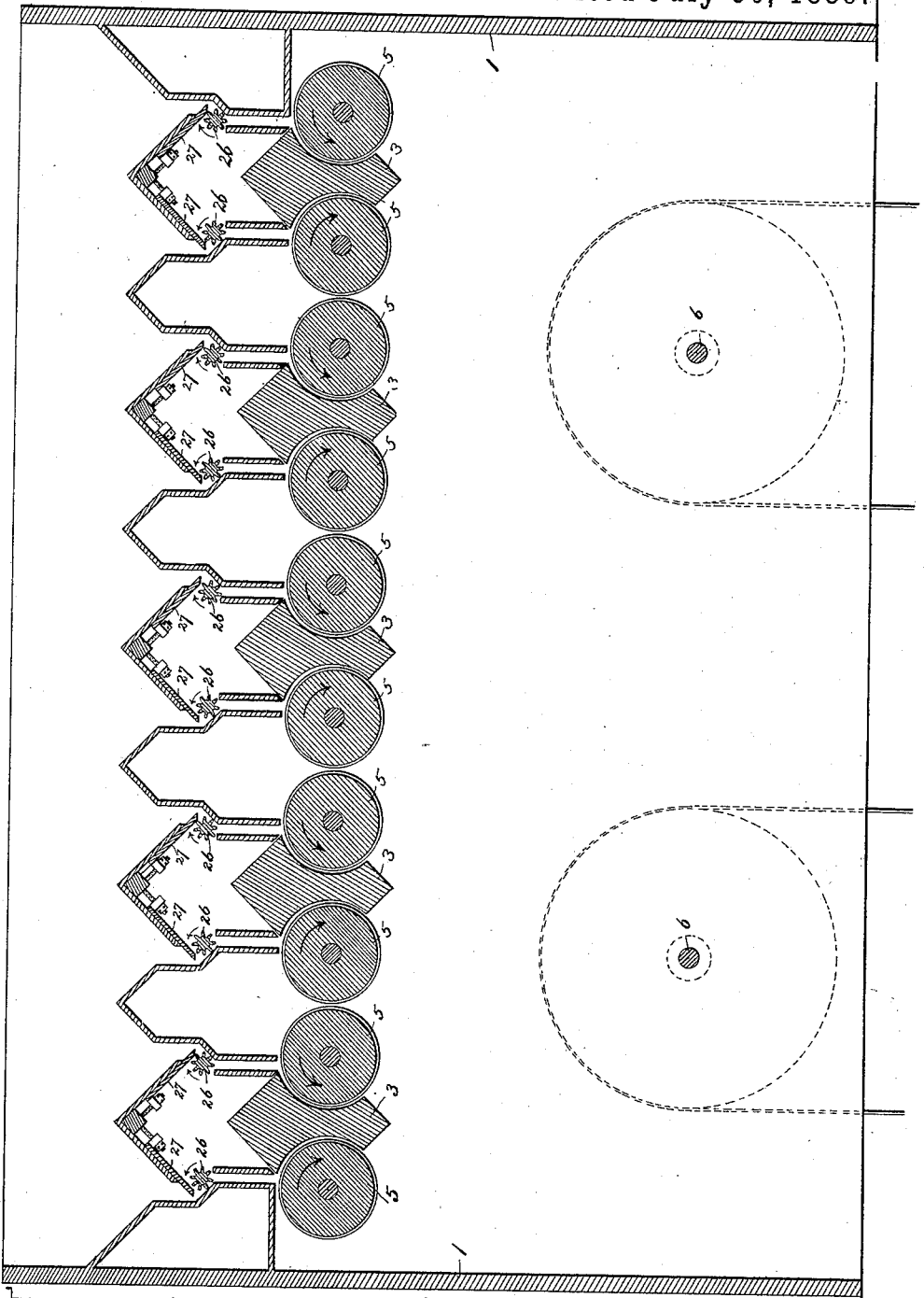

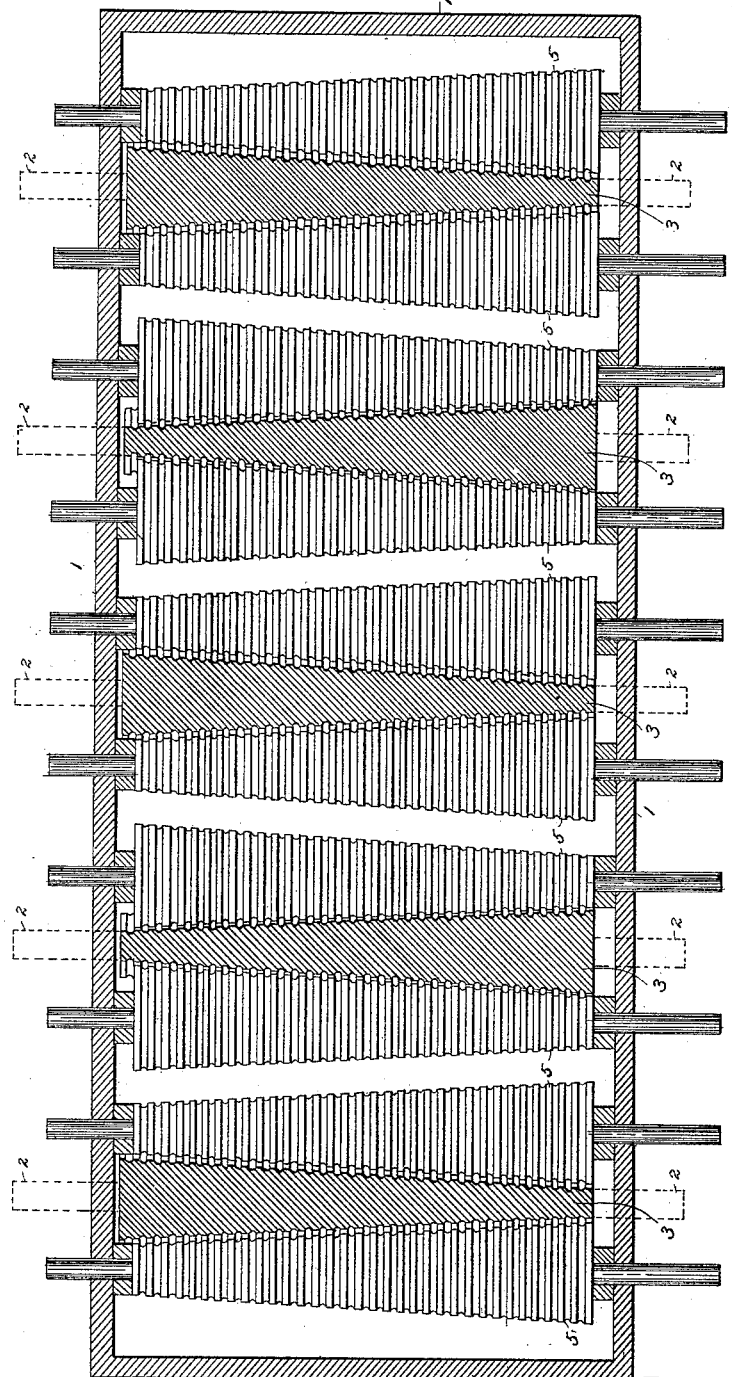

(No Model.) 5 Sheets—Sheet 4.
G. A. BUCHHOLZ, Dec'd.
O. KNIGHT, Administrator.
GRAIN HULLING AND REDUCING MACHINE.
No. 408,077. Patented July 30, 1889.
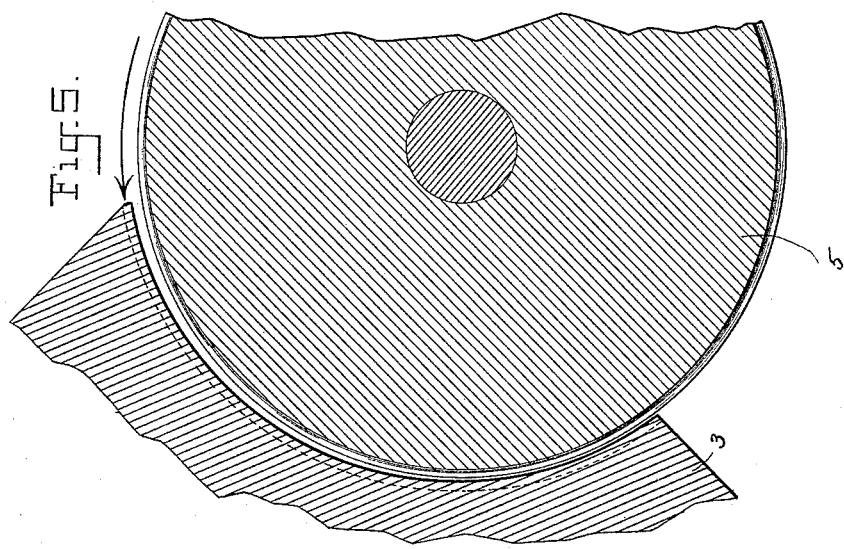
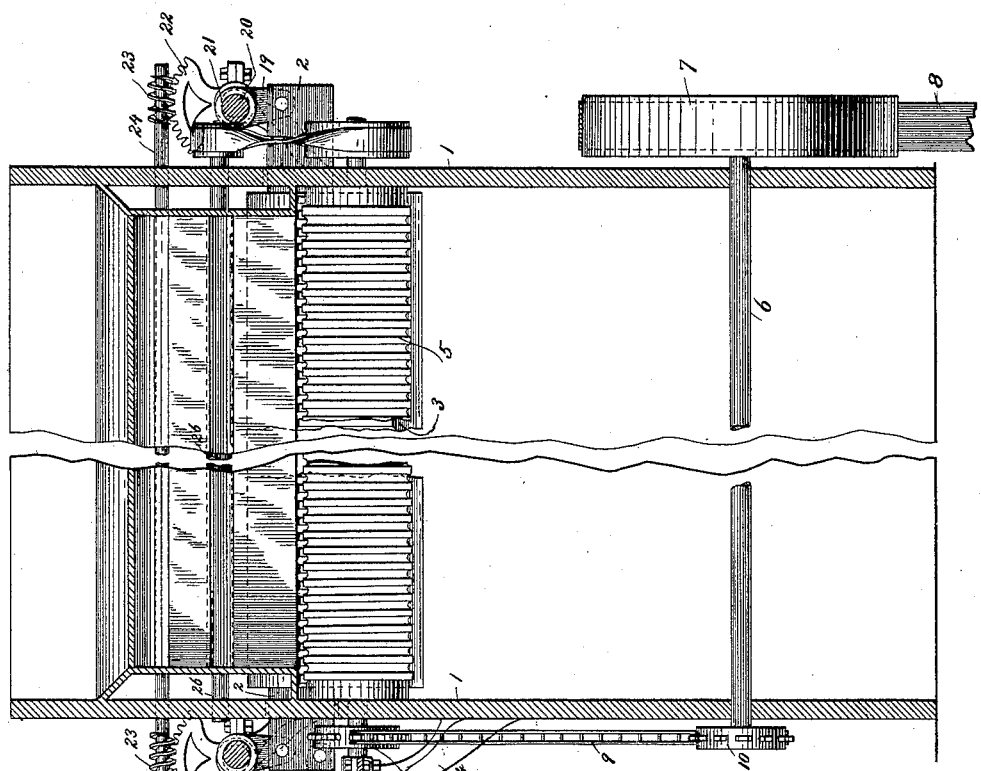
Witnesses. Inventor.
John F. Nelson Gustav A. Buchholz
Lillie Hamm By Knight & Bro
Attorneys.
N. PETERS, Photo-Lithographer, Washington, D. C.

(No Model.) 5 Sheets—Sheet 5.

G. A. BUCHHOLZ, Dec'd.
O. KNIGHT, Administrator.
GRAIN HULLING AND REDUCING MACHINE.

No. 408,077. Patented July 30, 1889.

Witnesses
John F. Nelson
Lillie Hanna

Inventor.
Gustav A. Buchholz
By Knight Bros
Attorneys.

UNITED STATES PATENT OFFICE.

GUSTAV ADOLPH BUCHHOLZ, OF FRANKFORT-ON-THE-MAIN, PRUSSIA, GERMANY; OCTAVIUS KNIGHT (ADMINISTRATOR OF SAID GUSTAV ADOLPH BUCHHOLZ, DECEASED) ASSIGNOR OF ONE-THIRD TO JAMES UNDERHILL ROBERTSON, OF NEW YORK, N. Y.

GRAIN HULLING AND REDUCING MACHINE.

SPECIFICATION forming part of Letters Patent No. 408,077, dated July 30, 1889.

Application filed August 2, 1888. Serial No. 281,816. (No model.)

*To all whom it may concern:*

Be it known that I, GUSTAV ADOLPH BUCHHOLZ, a subject of the King of Prussia, residing at Frankfort-on-the-Main, Prussia, in the Empire of Germany, have invented certain new and useful Improvements in Grain Hulling and Reducing Machines, of which the following is a specification.

My invention relates to a machine whose primary object is the complete separation (without wastage) of the grain proper or kernel of wheat or other grain from its hull or cortex. The same or a similar machine is likewise utilized, when desired, for cracking or reducing the grain proper to a condition which is free from dust or "break-flour."

Essential features of my invention are a circumferentially grooved, fluted, or corrugated cylinder or conic frustum, which is rotated on its axis and which has fitted to its descending side a similarly-grooved "concave," which is reciprocated longitudinally of the cylinder. A suitable feeding device, located above the cylinder and concave, causes the desired delivery of the grain to be operated on to the passages formed by the opposing grooves of the said cylinder and concave. In practice I preferably arrange several such cylinders with double-faced concaves in a single machine in the manner hereinafter fully explained.

My invention therefore consists in a peculiar construction of machine for cracking or reducing grain or other material, which I will first describe fully with reference to the accompanying drawings, reference being had to the claims for the pointing out of the novel features.

In said drawings, Figure 1 is a plan view of a machine constructed in accordance with my invention. Fig. 2 is a vertical sectional view in a plane transverse to the hulling or reducing members. Fig. 3 is a plan view taken below the feed mechanism and showing the reciprocating members in section. Fig. 4 is a vertical sectional view in a plane parallel with the hulling or reducing members. Fig. 5 is an end view, to a much larger scale than the other views, of portions of meeting faces of two adjacent hulling or reducing members. Fig. 6 is an end view of the machine.

The frame or casing 1 is represented in the main diagrammatically. It may be of any suitable form. In its ends are vertical slots through which pass the necks 2 of bars 3 and the journals of rollers 5. The bars 3 are formed with a cross-section as shown in Fig. 2. On opposite sides are concave working-faces, which partially surround the rollers 5. The concave faces of members 3 and the whole exterior of members 5 are grooved in planes substantially at right angles to the axis of the rollers 5. The groovings are made of suitable width and depth, according to the material to be treated and to the effect which it may be desired to produce thereon. As shown in Fig. 5, the space between the surface of each roller and its corresponding concave on the member 3 gradually tapers downward to a line about horizontal with the mathematical axis of the roller, and thence downward the working-surfaces may be equidistant or concentric with each other to the place of exit.

Preferably the upper end of the concave stops sufficiently short of the vertical radius of the roller to allow the material to be fed on the descending side of the roller.

The rollers 5 may, as shown in Fig. 4, be cylindrical throughout, (excepting for the groovings thereon,) or, as shown in Fig. 3, they may slightly taper, so as to have the form of conic frustums. In Fig. 3 the taper is greatly exaggerated in order to be apparent to the eye. In either case the partly-inclosing concaves of the members 3 are made of such form as to correspond with the curve of the roller.

The members 3 and 5 are by the mechanism to be presently described so operated that the rollers 5 are rotated toward the concaves of the bars 3, whereby material fed above the rollers will be carried down between the working-surfaces. The bars 3 are reciprocated in planes parallel with the axes of the rollers, so that the adjacent surfaces of the members 3 and 5 will at one end of their stroke present to the descending grain or other material a series of gradually-tapering channels formed by the grooves, which are then directly opposite each other. This allows the grain to enter freely, and it is assisted in so doing by the rotation of the rollers. As soon as the channels are filled, however, the next or retrograde reciprocation of the bars 3 carries all of the sharp edges of the grooves of each member directly across the adjacent grooves of the opposing member, cracking and stripping the hull or bran portions from the grain proper and separating the two portions from one another. The return or forward stroke of the bar 3 again brings the several channels opposite to each other, allowing the thus detached kernels and bran portions to fall lower in the grooves for further treatment when desired and presenting at the upper part the same series of channels to receive a new charge of grain, which is treated in the same manner. The rollers 5 not only act as described in accelerating the feed, but they assist materially in discharging from between the working-surfaces all material which has been sufficiently treated.

The tapering form of cracking or breaking roller 5 shown in Fig. 3 is for some purposes or conditions of grain possibly superior to the cylindrical form in that the return-stroke of the reciprocating bar not only brings the grooves of the working-surfaces opposite to each other to form channels, but actually separates the working-surfaces slightly, so as to facilitate entrance from above of fresh grain and the discharge below of material which has been treated.

The driving-shafts 6, which are journaled in the ends of the frame, receive motion in opposite directions by any suitable transmitting mechanism—as, for example, through pulleys 7 and belts 8 at one end—and communicate motion to the rollers 5 by means of chains or bands 9 and sprockets or pulleys 10 11 in such manner that the alternate rollers 5 rotate in opposite directions. Besides their bearings in the ends of the frame 1, the ends of the rollers, spindles, or shafts are provided with bearings 12 on a T-bar 13, carried by brackets 14, and their motion is thus steadied. The same brackets have bearings for a shaft 15, which has a main operating-lever 16, connected to one end, and a series of crank-arms 17, each connected to one of the links 18, joined to the longitudinal reciprocating bars or cracking members 3.

The operation of lever 16 is effected in any manner, and may be so timed with relation to the rotation of rollers 5 as to insure any desired breaking or cracking of the material before its discharge and to insure the complete separation of the grain proper or semolina from the bran.

The bars 3 have their necks connected to hangers 19, which hang from eccentrics 20 in shafts 21, arranged on each end of the machine. The shafts 21 carry segment-racks 22, within which mesh worms 23 of a shaft 24, having a wheel 25 for operating it. By this means the bars 3 can all be simultaneously raised or lowered at both ends by turning the single shaft 24.

It is immaterial what kind of feed device be employed. In view of the positive feed by the rollers 5, however, I have shown in Fig. 2 a feeding device 26 27, which will allow only the amount of stock to be fed to the roller that it may be desired to handle. The feed-rollers 26 are constantly driven by belt and pulley from the rollers 5, (see Fig. 4,) while adjustable sides 27 regulate the amount of material to be supplied to these feed-rollers.

I am aware that Patent No. 331,165 to Thomas Sheldon for machine for splitting wheat has combined with a rotating annularly-grooved roller a reciprocating annularly-grooved cylindrical bar. Such, therefore, I do not claim.

I am also aware that it is common to combine with a revolving corrugated grinding-cylinder a non-moving concentric and corrugated concave, and the present invention does not comprehend such cylinders and fixed concaves.

I claim—

1. In a hulling or grain-reducing machine, the combination, with a horizontally-journaled roller having numerous equidistant and like circumferential grooves, flutings, or corrugations, of a similarly-grooved longitudinally-reciprocated concave concentric or nearly concentric with and in near proximity to the descending side of said roller, substantially as and for the purposes set forth.

2. In a hulling or grain-reducing machine, the combination of tapered circumferentially-grooved rollers, and a longitudinally-reciprocated, correspondingly-grooved, and reversely-tapered concave between and concentric with said rollers, and means for producing such longitudinal reciprocation, as and for the purposes set forth.

G. ADOLPH BUCHHOLZ.

Witnesses:
WM. H. BLAIN,
HARRY E. KNIGHT.